US009361723B2

(12) United States Patent
Zhou et al.

(10) Patent No.: US 9,361,723 B2
(45) Date of Patent: Jun. 7, 2016

(54) METHOD FOR REAL-TIME FACE ANIMATION BASED ON SINGLE VIDEO CAMERA

(71) Applicant: ZHEJIANG UNIVERSITY, Hangzhou (CN)

(72) Inventors: Kun Zhou, Hangzhou (CN); Yanlin Weng, Hangzhou (CN); Chen Cao, Hangzhou (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 110 days.

(21) Appl. No.: 14/517,758

(22) Filed: Oct. 17, 2014

(65) Prior Publication Data
US 2015/0035825 A1    Feb. 5, 2015

Related U.S. Application Data

(63) Continuation of application No. PCT/CN2013/075117, filed on May 3, 2013.

(30) Foreign Application Priority Data

Feb. 2, 2013  (CN) .......................... 2013 1 0047850

(51) Int. Cl.
*G06T 15/00* (2011.01)
*G06T 13/40* (2011.01)
(Continued)

(52) U.S. Cl.
CPC ............ *G06T 13/40* (2013.01); *G06K 9/00281* (2013.01); *G06K 9/00302* (2013.01); *G06K 9/6207* (2013.01); *G06T 7/002* (2013.01); *G06T 7/2046* (2013.01); *G06T 2207/30201* (2013.01)

(58) Field of Classification Search
None
See application file for complete search history.

(56) References Cited

U.S. PATENT DOCUMENTS 6,956,569 B1   10/2005  Roy et al. ...................... 345/426
2009/0153552 A1*  6/2009  Fidaleo .............. G06Q 30/0247
                                                                345/419
(Continued)

FOREIGN PATENT DOCUMENTS

CN   101303772 A   11/2008
CN   101311966 A   11/2008
(Continued)

OTHER PUBLICATIONS

Castelan, Mario et al., "A coupled Statistical Model for Face Shape Recovery From Brightness Images" IEEE Transaction on Image Processing, vol. 16, No. 4, Apr. 2007, pp. 1139-1151.
(Continued)

*Primary Examiner* — Kee M Tung
*Assistant Examiner* — Frank Chen
(74) *Attorney, Agent, or Firm* — J.C. Patents

(57) ABSTRACT

The invention discloses a method for real-time face animation based on single video camera. The method tracks 3D locations of face feature points in real time by adopting a single video camera, and parameterizes head poses and facial expressions according to the 3D locations, finally may map these parameters into an avatar to drive face animation of an animation character. The present invention may achieve a real time speed by merely adopting a usual video camera of the user instead of an advanced acquisition equipment; the present invention may process all kinds of wide-angle rotations, translation and exaggerated expressions of faces accurately; the present invention may also work under different illumination and background environments, which include indoor and sunny outdoor.

6 Claims, 3 Drawing Sheets

(51) Int. Cl.
G06K 9/00 (2006.01)
G06T 7/00 (2006.01)
G06T 7/20 (2006.01)
G06K 9/62 (2006.01)

(56) References Cited

U.S. PATENT DOCUMENTS

| | | | | |
|---|---|---|---|---|
| 2012/0113106 A1 | 5/2012 | Choi et al. | | 345/419 |
| 2012/0323581 A1 | 12/2012 | Strietzel et al. | | 704/276 |
| 2014/0043329 A1* | 2/2014 | Wang | | G06T 17/20 |
| | | | | 345/420 |

FOREIGN PATENT DOCUMENTS

| | | |
|---|---|---|
| CN | 101783026 A | 7/2010 |
| CN | 101944238 A | 1/2011 |
| CN | 10-2011-0021330 A | 3/2011 |
| CN | 102103756 A | 6/2011 |
| CN | 102376100 A | 3/2012 |
| CN | 102831382 A | 12/2012 |
| CN | 103093490 B | 8/2015 |

OTHER PUBLICATIONS

Ding, Bin et al., "3D face modeling and expression animation based on single image" Computer Engineering and Design, vol. 33, No. 7, Jul. 2012, pp. 2744-2863, (Abstract).
Lewis, J.P. et al., "Direct-Manipulation Blendshapes" IEEE engineering in medicine and biology magazine: the quarterly magazine of the Engineering in Medicine & Biology Society, Jul./Aug. 2010, pp. 42-50.
Liu, Fu Xin, "Video-driven cartoon animation based on facial expressions system" Master Thesis Paper of University of Guizhou University, Mar. 1, 2008, (Abstract).
Zhang, Zhengyou, "A Flexible New Technique for Camera Calibration" IEEE Transactions on Pattern Analysis and Machine Intelligence, vol. 22, No. 11, Nov. 2000, pp. 1330-1334.
Chen Cao et al. "FaceWarehouse : a 3D Facial Expression Database for Visual Computing" IEEE Transactions on Visualization and Computer Graphics, vol. 20, Issue 3, Mar. 2014, pp. 413-425.
Daniel Vlasic et al., "Face Transfer with Multilinear Models" ACM Transactions on Graphics (TOG)—Proceedings of ACM SIGGRAPH, vol. 24, Issue 3, Jul. 2005, pp. 426-433.
Derek Bradley et al., "High Resolution Passive Facial Performance Capture" ACM Transactions on Graphics (TOG)—Proceeding of ACM SIGGRAPH, vol. 29, Issue 4, Jul. 2010, Article No. 41.
Douglas Decarlo et al., "Optical Flow Constraints on Deformable Models with Applications to Face Tracking" International Journal of Computer Vision, vol. 28, No. 2, Jul. 2000, pp. 99-127.
Frederic Pighin et al., "Resynthesizing Facial Animation through 3D Model-Based Tracking" The Proceedings of the Seventh IEEE International Conference, vol. 1, Sep. 1999, pp. 143-150.
Frederic Pighin et al., "Synthesizing Realistic Facial Expression from Photographs" SIGGRAPH Proceedings of the 25$^{th}$ annual conference on Computer graphics and interactive techniques, 1998, pp. 75-84.
Thabo Beeler et al., "High-Quality Passive Facial Performance Capture using Anchor Frames" ACM Transactions on Graphics (TOG)—Proceedings of ACM SIGRAPH, vol. 30, Issue 4, Jul. 2011, Article No. 75.
Haoda Huang et al., "Leveraging Motion Capture and 3D Scanning for High-fidelity Facial Performance Acquisition" ACM Transactions on Graphics (TOG)—Proceedings of ACM SIGRAPH, vol. 30, Issue 4, Jul. 2011, Article No. 74.
Irfan Essa et al., "Modeling, Tracking and Interactive Animation of Faces and Heads using Input from Video" Proceeding of the Computer Animation, p. 68-79.
Jaewoo Seo et al., "Compression and Direct Manipulation of Complex Blendshape Models" ACM Transactions on Graphics (TOG)—Proceedings of ACM SIGRAPH, vol. 30, Issue 6, Dec. 2011, Article No. 164.
Jin-Xiang Chai et al., "Vision-based Control 3D Facial Animation" Eurographics / SIGGRAPH Symposium on Computer Animation, 2003, pp. 193-206.
J.P. Lewis et al., "Direct-Manipulation Blendshapes" IEEE Comput Graph Appl., vol. 30, No. 4, Jul. 2010, pp. 42-50.
Lance Williams, "Performance-Driven Facial Animation" SIGGRAPH Proceedings of the 17$^{th}$ annual conference on Computer graphics and interactive techniques, pp. 235-242.
Li Zhang et al., "Spacetime Faces: High Resolution Capture for Modeling and Animation" ACM Transactions on Graphics (TOG)—Proceedings of ACM SIGRAPH, vol. 23, Issue 3, Aug. 2004, pp. 548-558.
Thabo Beeler et al., "High-Quality Single-Shot Capture of Facial Geometry" ACM Transactions on Graphics (TOG)—Proceedings of ACM SIGGRAPH, vol. 29, Issue 4, Jul. 2010, Article No. 40.
Thibaut Weise et al., "Face/Off: Live Facial Puppetry" Eurographics / ACM SIGGGRAPH Symposium on Computer Animation, 2009, pp. 7-16.
Thibaut Weise et al., "Realtime Performance-Based Facial Animation" ACM Transactions on Graphics (TOG)—Proceedings of ACM SIGGRAPH, vol. 30, Issue 4, Jul. 2011, Article No. 77.
Volker Blanz et al., "A Morphable Model for the Synthesi of 3D Faces" SIGGGRAPH Proceedings of the 26$^{th}$ annual conference on Computer graphics and interactive techniques, pp. 187-194.
Xudong Cao et al., "Face Alignment by Explicit Shape Regression" International Journal of Computer Vision, vol. 107, Issue 2, Apr. 2014, pp. 177-190.
Zhengyou Zhang, "A Flexible New Technique for Camera Calibration" IEEE Transactions on Pattern Analysis and Machine Intelligence, vol. 22, No. 11, Nov. 2000, pp. 1330-1334.
International Search Report of corresponding International PCT Application No. PCT/CN2013/075117, dated Nov. 7, 2013.

* cited by examiner

METHOD FOR REAL-TIME FACE ANIMATION BASED ON SINGLE VIDEO CAMERA

CROSS-REFERENCE TO RELATED APPLICATIONS

This application is a continuation of International Application No. PCT/CN2013/075117, filed on May 5, 2013, which claims priority to Chinese Patent Application No. 201310047850.2, filed on Feb. 2, 2013, both of which are hereby incorporated by reference in their entireties.

TECHNICAL FIELD

The present invention relates to face motion capture and real-time animation technologies and, in particular, to a method for real-time face animation based on single video camera.

BACKGROUND

The background pertaining to the present invention is as follows:

1. Face Motion Capture

Face expression capture is an important component of the realistic graphics, which is widely applied to films, animations, games, internet chat and education and other fields. A face animation system based on the face motion capture is used to estimate expressions and motions of a user, and map them into another object model. There are plenty of relevant techniques to achieve this goal at present. In order to interact directly with users, active sensing methods are usually adopted, which include placing some facial markers on faces (Williams, L. 1990. Performance driven facial animation. In Proceedings of SIGGRAPH, 234-242; Huang, H., Chai, J., Tong, X., and Wu, H., T., 2011. Leveraging motion capture and 3d scanning for high-fidelity facial performance acquisition. ACM Trans. Graph. 30, 4, 74:1-74:10.), or projecting structured light (Zhang, L., Snavely, N., Curless, B., and Seitz, S. M. 2004. Space time faces: high resolution capture for modeling and animation. ACM Trans. Graph. 23, 3, 548-558; Weise, T., Li, H., Gool, L. V., and Pauly, M. 2009. Face/off: Live facial puppetry. In Eurographics/Siggraph Symposium on Computer Animation.). These methods may acquire accurate face geometry with high resolution, however, these active sensing methods usually need to be supported by expensive equipment. In the meantime, due to interference from facial markers or structured light, they are not user-friendly and, thus, cannot be widely applied to ordinary users.

Another kind of systems are passive systems, which do not actively send signals to the environment where they locate or place facial markers on faces, but merely analyze and capture face motions according to received color information and etc. Where some methods merely use a single video camera to capture face motions, including "Essa, I., Basu, S., Darrell, T., and Pentland, A. 1996. Modeling, tracking and interactive animation of faces and heads: Using input from video. In Computer Animation, 68-79; Pighin, F., Szeliski, R., and Salesin, D. 1999. Resynthesizing facial animation through 3d model-based tracking. In International Conference on Computer Vision, 143-150; CHAI, J.-X., XIAO, J., AND HODGINS, J. 2003. Vision-based control of 3d facial animation. In Eurographics/SIGGRAPH Symposium on Computer Animation, 193-206; Vlasic, D., Brand, M., Pfister, H. and Popovic, J. 2005. Face transfer with multilinear models." and other work. A drawback of these methods is that the precision of their results is poor, and thereby they cannot handle with large rotations or exaggerated expressions of faces, besides, certain environments are required when using these methods, for example, these methods can merely be adopted in an indoor environment with uniform illumination and without interferences from shadow and highlight.

Some methods use a camera array, which may capture face data from a plurality of angles of view and convert it into stereo data for 3D reconstruction, these work include "BEELER, T., BICKEL, B., BEARDSLEY, P., SUMNER, R., AND GROSS, M. 2010. High-quality single-shot capture of facial geometry. ACM Trans. Graph. 29, 4, 40:1-40:9; BRADLEY, D., HEIDRICH, W., POPA, T., AND SHEFFER, A. 2010. High resolution passive facial performance capture. ACM Trans. Graph. 29, 4, 41:1-41:10; BEELER, T., HAHN, F., BRADLEY, D., BICKEL, B., BEARDSLEY, P., GOTSMAN, C., SUMNER, R. W., AND GROSS, M. 2011. High-quality passive facial performance capture using anchor frames. ACM Trans. Graph. 30, 4, 75:1-75:10." and etc.; these methods may obtain relatively accurate 3D face expressions, but also require expensive equipments and have high requirements on environments and other disadvantages.

2. Vision-Based Face Feature Point Tracking

The capture of face expressions usually needs to be performed by tracking feature points of faces in input images, such as the corners of the eyes, ends of mouth and other locations. For a common input video, an optical flow (Optical Flow) method is generally adopted. However, due to influence of the input data noise, the optical flow locating is not very reliable for those inconspicuous face feature points (such as points on cheeks), and a drift (Drift) error may often be resulted from the accumulation of errors between frames. Besides, the optical flow method may cause relatively large error in processing fast motions, illustration changes and other aspects.

In order to track the feature points more accurately, some operations use geometric constraints between the feature points. In this way, each feature point not only relates to its local information calculation, but also is affected by other feature points. Different types of geometric constraints are widely used, which include a limitation for drift of the feature points when expressions change (CHAI, J.-X., XIAO, J., AND HODGINS, J. 2003. Vision-based control of 3d facial animation. In Eurographics/SIGGRAPH Symposium on Computer Animation, 193-206.), meeting physics-based deformable model requirements (ESSA, I., BASU, S., DARRELL, T., AND PENTLAND, A. 1996. Modeling, tracking and interactive animation of faces and heads: Using input from video. In Computer Animation, 68-79; DECARLO, D., AND METAXAS, D. 2000. Optical flow constraints on deformable models with applications to face tracking. Int. Journal of Computer Vision 38, 2, 99-127.), and some corresponding relationships of face models constructed from plenty of sample spaces (PIGHIN, F., SZELISKI, R., AND SALESIN, D. 1999. Resynthesizing facial animation through 3d model-based tracking. In International Conference on Computer Vision, 143-150; BLANZ, V., AND VETTER, T. 1999. A morphable model for the synthesis of 3d faces. In Proceedings of SIGGRAPH, 187-194; VLASIC, D., BRAND, M., PFISTER, H., AND POPOVIC 766, J. 2005. Face transfer with multilinear models. ACM Trans. Graph. 24, 3(July), 426-433.). These methods can track face feature points in images and videos to some extent, but because what they obtained are all 2D feature points in images, they have limitations on processing rotations.

3. 3D Face Model

In our work, during the preprocessing process, 3D information is obtained from 2D images by virtue of a 3D face model.

In existing graphics and visual applications, various 3D face models have been widely applied. In face animation applications, an expression blendshape model (Blendshapes) is widely applied. This is a subspace expression to express face motions, which includes a series of basic face expressions that constitute a linear space of face expressions. By adopting the blendshape model, various face animation effects may be obtained through calculation, such as by morphing (Morphing) basic face motions therein (PIGHIN, F., HECKER, J., LISCHINSKI, D., SZELISKI, R., AND SALESIN, D. H. 1998. Synthesizing realistic facial expressions from photographs. In Proceedings of SIGGRAPH, 75-84.) or by linear combinations of the basic face motions therein (Linear combinations) (LEWIS, J. P., AND ANJYO, K. 2010. Direct manipulation blendshapes. IEEE CG&A 30, 4, 42-50; SEO, J., IRVING, G., LEWIS, J. P., AND NOH, J. 2011. Compression and direct manipulation of complex blendshape models. ACM Trans. Graph. 30, 6.) and etc.

Multilinear models (Multilinear Models) represent a blendshape model decomposition with plenty kinds of control attributes (such as identity, expression, mouth articulation). One of the important characteristics of the expression blendshape model is that, different identity's expressions correspond to similar basic motion coefficients in the blendshape model. By virtue of this attribute, many face animation applications use the expression blendshape model, and transfer face motions of users to virtual avatars by delivering the basic motion coefficients.

SUMMARY

In view of the deficiencies of the prior art, the present invention provides a method for real-time face animation based on single video camera. The present invention may be used by ordinary users on common desktop computers, to accurately capture user expressions under different environments in real time and drive virtual avatars. The present invention has characteristics of easy to use, robust, fast and etc., which may be applied in online games, internet chat, education and other applications, and thereby has high practical value.

The goal of the present invention is accomplished by the following technical solutions: a method for real-time face animation based on single video camera, which includes the following steps:

(1) image acquisition and labeling: capturing multiple 2D images of a user with different poses and expressions by adopting a video camera, obtaining corresponding 2D face feature points for each image by adopting a 2D facial feature point regressor, and manually adjusting an inaccurate feature point which is detected automatically;

(2) data preprocessing: generating a user expression blendshape model and calibrating a camera internal parameter by adopting the images with labeled 2D face feature points, and thereby obtaining 3D feature points of the images; training, by adopting the 3D feature points and the 2D images acquired in step 1, to obtain a regressor that maps 2D images to the 3D feature points;

(3) 3D feature points tracking: the user inputs an image in real time by using the video camera; for the input image, tracking the 3D face feature points in a current frame in real time by combining with the 3D face feature points in a previous frame and adopting the regressor obtained in step 2;

(4) pose and expression parameterization: iteratively optimizing, by adopting locations of the 3D face feature points and combining with the user expression blendshape model obtained in step 2, to obtain parametric presentation of the head poses and facial expressions;

(5) avatar driving: mapping the head pose and facial expression parameters into a virtual avatar to drive an animation character to perform face animation.

The beneficial effects of the present invention are: the present invention can be easily applied, without the need for expensive physical equipments at the facial markers or the projected structured light and etc., the user can accomplish the capture and parameterization of head poses and facial expressions, and map the parameterization result into the virtual avatar to drive face animation of the animation character simply by one-time data acquisition and preprocessing via a single video camera on a common desk computer, which facilitates the use for an ordinary user. In contrast to existing methods, the present invention may effectively process head's fast movements, large rotations and exaggerated facial expressions in videos. It can process certain illustration condition changes, and may be applied under different environments (including an indoor environment and an outdoor environment with direct sunlight and etc.). Besides, the method of the present invention is very efficient, in the detailed description of embodiments, it only takes less than 15 milliseconds for a common computer to accomplish the tracking of feature points, the parameterization of head pose, facial expressions and the avatar mapping in one frame, which provides very good user experience.

DESCRIPTION OF EMBODIMENTS

The core technology of the invention is to obtain 3D feature points of a face from 2D images, thereby parameterizing head poses and facial expressions of a user, and mapping into a virtual avatar. The method is mainly composed of five major steps as follows: image acquisition and labeling, data preprocessing, 3D feature point tracking, pose and expression parameterization, and avatar driving. Specifically, the method includes the following steps:

1. Image acquisition and labeling: a user imitates and makes various poses and expressions, and corresponding images are shot by adopting a video camera. Corresponding 2D face feature points are obtained for each image by adopting a 2D feature points regressor. And the user is allowed to manually adjust an inaccurate feature point which is detected automatically.

Firstly, in the present invention, a group of user images with different poses and expressions are acquired. The group of images is divided into two parts: rigid motions and non-rigid motions. The rigid motions mean that the user keeps neutral expressions and makes 15 head poses with different angles in the meantime. We use an euler angle (yaw, pitch, roll) to represent these angles: yaw is sampled from −90° to 90° with a sampling interval of 30°, keeping pitch and roll at 0° in the meantime; pitch is sampled from −30° to 30° with a sampling interval of 15° but removing 0°, keeping yaw and roll at 0° in the meantime; roll is sampled from −30° to 30° with a sampling interval of 15° but removing 0°, and keeping yaw and pitch at 0° in the meantime. Noticing that we do not require that the angles of user's poses and the required angle configuration are completely exact, where probable estimation is sufficient.

The non-rigid motions include 15 different expressions under 3 yaw angles. These expressions are relatively large expressions, which differ greatly among different identities. These expressions are: mouth stretch, smile, brow raise, disgust, squeeze left eye, squeeze right eye, anger, jaw left, jaw right, grin, chin raise, lip pucker, lip funnel, cheek blowing and eyes closed.

Figure 1:
FIG. 1 is a diagram of an acquired 2D image and labeled 2D image feature points in an image acquisition and labeling step of the present invention.

For each user, 60 images are acquired in all. We use a general 2D facial feature points regressor to locate 75 feature points automatically for each image (as shown in FIG. 1), these feature points are mainly divided into two parts: 60 internal feature points (such as features of the eyes, the eyebrows, the nose and the mouth part), and 15 external profile points. The present invention uses the regressor described in (CAO, X., WEI, Y., WEN, F., AND SUN, J. 2012. Face alignment by explicit shape regression. In Computer Vision and Pattern Recognition (CVPR), 2887-2894.) to automatically locate these feature points.

Some biases may exist on the automatically located 2D feature points, the user may correct a feature point which is not located accurately with a simple drag-and-drop tool, specifically, pitching on the feature point by a mouse click, and then pressing on the mouse till it is dragged to a right location on the image.

2. Data preprocessing: generating a user expression blendshape model and calibrating a camera internal parameter by adopting the images with labeled 2D face feature points, and thereby obtaining 3D feature points of the images; training, by adopting the 3D feature points and the 2D images acquired in step 1, to obtain a regressor that maps 2D images to the 3D feature points.

2.1 Generation of a User Expression Blendshape Model

The user expression blendshape model includes a neutral expression shape $B_0$ of the user and 46 FACS expression shapes $\{B_1, B_2, \ldots, B_{46}\}$. These expression shapes constitute an expression linear space of the user, any expression B of the user may be obtained by a linear interpolation of basic expressions in the blendshape model:

$$B = B_0 + \sum_{i=1}^{46} \alpha_i B_i$$

Where, $B_0$ is the neutral expression shape of the user, $B_i$ is a basic expression shape in the user expression blendshape model, $\alpha_i$ is a coefficient of the basic expression, and B is an expression face shape obtained by interpolation.

We construct the user expression blendshape model by virtue of a 3D face expression model FaceWarehouse (CAO, C., WENG, Y., ZHOU, S., TONG, Y., AND ZHOU, K. 2012. Facewarehouse: a 3d facial expression database for visual computing. Tech. rep.). FaceWarehouse includes 150 identity data under different backgrounds, each identity data includes 46 FACS expression shapes. FaceWarehouse establishes a bi-linear model including two attributes, namely identity and expression, and constitutes a 3D core tensor $C_r$ (11K model vertices×50 identities×45 expressions) by adopting these data; representing with this core tensor, any identity's any expression F may be obtained by tensor contraction:

$$F = C_r \times_2 w_{id}^T \times_3 w_{exp}^T$$

Where, $w_{id}^T$ and $w_{exp}^T$ are respectively an identity column vector and an expression coefficient column vector in the tensor, $C_r$ is the core tensor of FaceWarehouse, and F is the expression obtained by the shrinkage calculation.

We use two steps to calculate the user expression blendshape model. In the first step, for each acquired image in the "image acquisition and labeling", we find a transformation matrix $M_i$, an identity coefficient $w_{id,i}^T$, and an expression coefficient $w_{exp,i}^T$, generate a 3D face shape, so that the projection of the 3D feature points corresponding to the 3D face shape on the image conforms to the labeled 2D feature points. This may be achieved by optimizing the following energy:

$$E_d = \sum_{k=1}^{75} \left\| \Pi_Q(M_i(C_r \times_2 w_{id,i}^T \times_3 w_{exp,i}^T)^{(v_k)}) - u_i^{(k)} \right\|^2$$

Where, $u_i^{(k)}$ is the k-th 2D feature point location in the i-th image, $v_k$ is a corresponding vertex index of 3D shape, $\Pi_Q$ represents the projection from 3D space points to the 2D points in image coordinate by virtue of a video camera projection matrix Q, $w_{id}^T$ and $w_{exp}^T$ are respectively the identity column vector and the expression coefficient column vector in the tensor, and $C_r$ is the core tensor of FaceWarehouse. We may use a coordinate descent method to solve $M_i$, $w_{id,i}^T$ and $w_{exp,i}^T$, namely, optimizing one variable while keeping the other two variables unchanged every time, and iteratively performing this step until the result is converged.

In the second step, since all the acquired images describe different poses or different expressions of the same person, we should ensure that the identity coefficients in all the images are consistent, namely, $w_{id}^T$ is consistent, so we fix the transformation matrix $M_i$ and the expression coefficient $w_{exp,i}^T$ of each image obtained in the first step and exp calculate the consistent identity coefficient $w_{id}^T$ on all the images. The energy which needs to be optimized is:

$$E_{joint} = \sum_{i=1}^{n} \sum_{k=1}^{75} \left\| \Pi_Q(M_i(C_r \times_2 w_{id}^T \times_3 w_{exp,i}^T)^{(v_k)}) - u_i^{(k)} \right\|^2$$

Where, $w_{id}^T$ is the uniform identity coefficient, n is the number of the acquired 2D images, definitions of other variables are the same as the former formula.

The optimizing process in the two steps needs to be calculated iteratively until the result is converged, in general situations, a satisfactory result can be obtained with iterations for three times. Once the consistent identity coefficient $w_{id}^T$ is obtained, the user expression blendshape model may be generated as:

$$B_i = C_r \times_2 w_{id}^T \times_3 (U_{exp} d_i), 0 \leq i \leq 47$$

Where, $U_{exp}$ is a truncation transformation matrix of the FaceWarehouse expression attribute, $d_i$ is an expression coefficient vector, of which the i-th element is 1 and other elements are 0, $C_r$ is the core tensor of FaceWarehouse, and $w_{id}^T$ is the uniform identity coefficient.

2.2 Camera Internal Parameter Calibration

The camera projection matrix describes that the 3D points in a camera coordinate are projected to 2D image coordinate, which totally depends on camera internal parameters, and can be expressed as the following projection matrix Q:

$$Q = \begin{pmatrix} f_x & \gamma & u_0 \\ 0 & f_y & v_0 \\ 0 & 0 & 1 \end{pmatrix}$$

Where parameters $f_x$ and $f_y$ represent focal lengths in units of pixels in the length and width directions, $\gamma$ represents skew in the x and y axis directions, and $u_0$ and $v_0$ represent a location of the image origin, namely, the intersection of the optical axis and the image plane. Many camera location methods (such as ZHANG, Z. 2000. A flexible new technique for camera calibration. IEEE Trans. Pattern Anal. Mach. Intell. 22, 11, 1330-1334.) may be used to calculate the projection matrix accurately, and these methods are usually performed by virtue of some standard calibration targets (such as a checkerboard).

The present invention uses a simple method without the help of special calibration targets, instead obtaining the projection matrix Q directly from the user acquired data. The present invention assumes that the used camera is an ideal pinhole camera, where $f=f_x=f_y$, $\gamma=0$, $(u_0, v_0)$ is the image central point, which can be directly calculated according to the size of the input image. Then only one unknown parameter is left for the projection matrix of the camera, namely, f. The present invention assumes different f, performs "generation of the user expression blendshape model" by adopting the assumed values, and finally calculates an error between the feature point projections corresponding to the fitted face model and the labeled feature points in all the acquired images. The error is a convex function with respect to f, namely, the function has a minimum value, and is monotonic at two sides of the minimum value. In this way, the present invention uses a dichotomy to find the correct f quickly.

2.3 Training Data Construction

The user expression blendshape model is obtained by executing the above steps, meanwhile, every input image has a corresponding pose transformation matrix and an expression coefficient, and thereby a 3D face shape in the image may be obtained:

$$F = M\left(B_0 + \sum_{i=1}^{46} \alpha_i B_i\right)$$

Where, F is the generated 3D face shape, M is the pose transformation matrix, $B_0$ is the neutral expression shape of this user, $B_i$ is a basic expression shape in the user expression blendshape model, and $\alpha_i$ is a coefficient of the basic expression.

Figure 2:
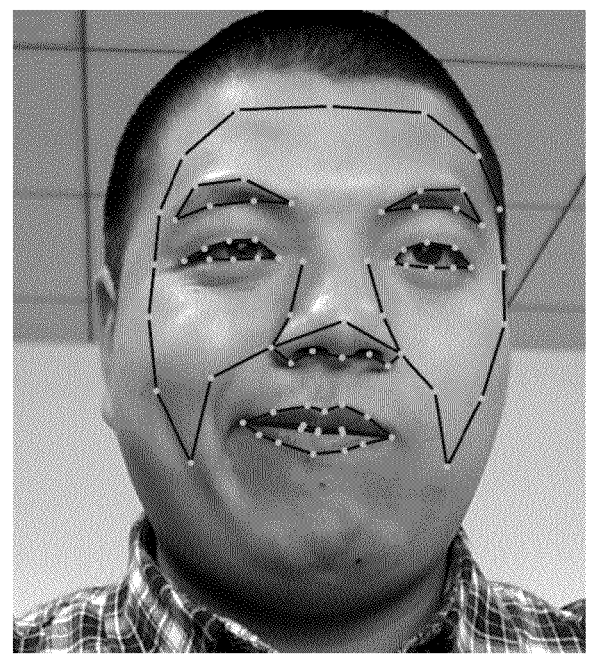
FIG. 2 is a diagram of 3D face feature points generated in a data preprocessing step of the present invention.

The 3D feature points of the image may be constructed by selecting the corresponding 3D vertex locations on the 3D face shape. In a real time video, since the profile points of a face is changing all the time, in the interest of calculation efficiency, the present invention replaces the 15 feature points of the external profile with 15 internal feature points (as shown in FIG. 2). We use $\{S_i^o\}$ to represent the 3D feature points corresponding to these images.

To achieve better generalization in representing facial shapes, the present invention needs to augment the acquired images and their corresponding 3D feature points. For each acquired image and its 3D feature points $(I_i, S_i^o)$, we perform translation for the 3D feature points $S_1^o$ along three axes in the camera coordinate to obtain another m−1 3D feature points, and obtain a set $\{S_{ij}, 2 \leq j \leq m\}$ for each $S_i^o$. The augmented 3D feature points correspond to other images. In practical operations, the present invention does not really generate the corresponding images, instead, it merely records the transformation matrix $M_j^a$ through which these augmented 3D feature points are transformed to the original feature points $S_i^o$, this matrix, together with $S_{ij}$, $S_i^o$, may provide complete information of the new images, and implicitly generate the augmented images. After data augmentation, n original data is augmented to n·m, we define them as $\{I_i, M_j^a, S_{ij}\}$. These augmented 3D feature point sets $\{S_{ij}, 1 \leq i \leq n, 1 \leq j \leq m\}$ are called 3D feature point spaces, which describe the variation range of the user face feature points in the 3D space.

For each augmented group of images/feature point data, the present invention assigns different initialization feature points. When selecting the data initial points for training, the present invention takes both the locality and the randomness of the data into account. For each group of images/feature points $(I_i, M_j^a, S_{ij})$, firstly, finding, from n original feature point sets $\{S_i^o\}$, G feature points which approximate $S_{ij}$ the most, then calculating the similarity of two feature points, that is, firstly, aligning the centers of the two feature points, then calculating a distance quadratic sum between corresponding feature points. We denote the most similar feature point sets as $\{S_{i_g}, 1 \leq g \leq G\}$. Then H feature points are randomly selected from augmented feature points of each $S_{i_g}$, which are denoted as $\{S_{i_g j_h}, 1 \leq h \leq H\}$. We set these feature points as the initialization feature point set of this image/feature point $\{I_i, M_j^a, S_{ij}\}$. In this way, the present invention finds G·H initialization feature points for each pair of images/feature points $\{I_i, M_j^a, S_{ij}\}$. Each training data is represented as $\{I_i, M_j^a, S_{ij}, S_{i_g j_h}\}$. Where $I_i$ is the 2D image, $M_j^a$ is the transformation matrix for performing translation augmentation for the feature points, $S_{ij}$ is the 3D feature point corresponding to $I_i$, and $S_{i_g j_h}$ is the initialization feature point.

After data augmentation and training set construction, we generate N=n·m·G·H training data. In all our examples, we select m=9, G=5, H=4. To simplify, we call the N training data $\{(I_i, M_i^a, S_i, S_i^c)\}$ later.

2.4 Regressor Training

Given the aforementioned N training data $\{(I_i, M_i^a, S_i, S_i^c)\}$, the present invention trains to generate a regression function from the initialization feature points $S_i^c$ to corresponding feature points $S_i$ by adopting information in the image $I_i$. The present invention uses a two-level boosted regressor, where the first level possesses T level weak classifiers, and each weak classifier possesses a K level primitive classifier.

In the boosted regression on the first layer, the present invention generates a group of index-pair used for constructing the primitive classifier. Firstly, calculating and obtaining an appearance vector by adopting the current feature points $S_i^c$ and the images $I_i$: randomly selecting P sampling points from the space range of the current feature points $S_i^c$, where the location of every sampling point p is represented as the location of a certain feature point in $S_i^c$ plus an offset $d_p$; then projecting the sampling point p to the image by adopting $\Pi_Q(M_i^a p)$, finally obtaining color values of corresponding pixel points from the image $I_i$. Then these P color values constitute an appearance vector $V_i$ of the training data in the boosted regression on the first layer. For each appearance vector $V_i$, $P^2$ index-pair features may be generated by calculating differences between pairwise elements in different locations.

In each primitive classifier on the second layer, effective features should be found among the $P^2$ serial number features generated on the first layer, and classification for the training data is performed based on this. For each training data ($I_i$, $M_i^a$, $S_i$, $S_i^c$), firstly, calculating differences between the current feature points $S_i^c$ and the groundtruth feature points $S_i$, then projecting these differences in a random direction to generate a scalar, and taking these scalars as random variables, finding, from the $P^2$ index-pair features, a feature which has the biggest correlation with this random variable. Repeating this step F times to generate F different features, and generating the primitive classifier according to the F features.

In each primitive classifier, the F features are set with a random threshold, these thresholds may classify all the training data into $2^F$ bins, for each training data, we compare the feature values calculated according to the index-pairs and the thresholds to determine to which bin the training data should be classified. In each bin b, the present invention calls all the data sets which drop into this bin $\Omega_b$, and calculates a regression output of the feature points in this bin with:

$$\delta S_b = \frac{1}{1+\beta/|\Omega_b|} \frac{\sum_{i \in \Omega_b}(S_i - S_i^c)}{|\Omega_b|}$$

Where, $|\Omega_b|$ represents the number of the training data in this bin, $S_i$ is the groundtruth feature points of the training data, $S_i^c$ is a current feature point of the training data, and $\beta$ is a free shrinkage parameter that helps to overcome the problem of overfitting when there is insufficient training data in the bin.

After we generate the primitive classifiers, we update all the current training data with the primitive classifiers. Namely, in every bin b of the primitive classifiers, adding its corresponding regression output to the current feature points of the training data which drop into this bin, namely, $S_i^c = S_i^c + \delta S_b$.

The training of the regressor will be executed T times iteratively, K boosted primitive classifiers generated every time constitute a weak classifier, which iteratively optimizes the regression output. The T boosted weak classifiers constitute a strong classifier, namely, the regressor we need. The parameter configuration in the present invention is T=10, K=300, P=400, F=5, $\beta$=250.

3. 3D feature point tracking: for the image input by the user in real time, the present invention can track the 3D face feature points in a current frame in real time by combining with the 3D face feature points in a previous frame, adopting the regressor obtained in the data preprocessing step and combining with the 3D face feature points S' in the previous frame.

Firstly, finding, from the original feature point set $\{S_i^o\}$, a feature point $S_r$ which is most similar with S', then transforming S' to the location of $S_r$ by a rigid rotation and translation ($M^a$), denoting the feature point in the transformed previous frame as S'*. Then finding, from the 3D feature point spaces $\{S_{ij}, 1 \leq i \leq n, 1 \leq j \leq m\}$ in the training sets, L feature point sets $\{S_l\}$ which are most similar with S'*, and passing through the whole regressor by taking each $S_l$ as the initialization feature point input.

Similar to the training of the regressor, a two-level boosted structure is applied when using the regressor to track the feature points. In the regression on the first layer, firstly, obtaining an appearance vector V according to the image I in the current frame, the current feature points $S_l$, the inverse matrix of the transformation matrix $M^a$, and the offset $\{d_p^r\}$ recorded during the training process. On the second layer, calculating features according to the index-pairs recorded in each primitive classifier and comparing with thresholds to determine the bin, and obtaining the regression output $\delta S_b$ of this bin. Finally updating the current feature points by adopting this output: $S_l = S_l + \delta S_b$.

Figure 3:
FIG. 3 is a diagram of a real-time input image and tracked 3D feature points in a 3D feature point tracking step of the present invention.

The present invention obtains L output feature points by letting L initial feature points passing through the regressor, finally, performs a median manipulation for these output feature points, and obtains the final result. Noticing that this feature point is in the 3D feature point space, so it needs to be transformed to the location in the original image by adopting the inverse matrix of the transformation matrix $M^a$. The input 2D image and the labeled 3D feature point result are shown in FIG. 3.

4. Pose and expression parameterization: iteratively optimizing, by adopting 3D locations of the feature points and combining with the user expression blendshape model obtained in the data preprocessing, to obtain parametric expressions of the head poses and facial expressions.

After obtaining the 3D feature point locations of the current frame in the previous step, the present invention performs parameterization for the face motions in the current frame by adopting them. The face motions are mainly divided into two parts: rigid head poses represented by the transformation matrix M, and face non-rigid expressions represented by the expression blendshape coefficient a. These two parameters may be obtained by optimizing the following matching energy:

$$E_t = \sum_{k=1}^{75} \left\| M\left(B_0 + \sum_{j=1}^{46} \alpha_j B_j\right)^{(v_k)} - S^{(k)} \right\|^2$$

Where, $S^{(k)}$ is the 3D location of the k-th feature point in S, $v_k$ is a corresponding vertex index in the 3D face shape, $B_0$ is the neutral expression face shape of the user, $B_j$ are other basic expression face shapes in the user expression blendshape model, $\alpha_j$ is a coefficient of the basic expression, and M is the transformation matrix of the head poses. Similar to "WEISE, T., BOUAZIZ, S., LI, H., AND PAULY, M. 2011. Realtime performance-based facial animation. ACM Trans. Graph. 30, 4(July), 77:1-77:10.", the present invention uses an animation prior to enhance time coherence during the tracking process. Given the expression coefficient vector $A_n = \{a^{-1}, a^{-2}, \ldots, a^{-n}\}$ in the previous n frames, combining it with the coefficient a of the current frame to form a single vector $(a, A_n)$, the present invention describes the probability distribution of this vector by a Gaussian mixture model:

$$p(a, A_n) = \sum_{s=1}^{S} \pi_s N(a, A_n | \mu_s, Cov_s)$$

Where N is the Gaussian distribution symbol, $\pi_s$ is a weight coefficient of the Gaussian model, $\mu_s$ is a mean value of the Gaussian model, and $Cov_s$ is a covariance matrix of the variable. The Gaussian Mixture Model may be obtained by training some pre-generated expression animation sequences (WEISE, T., BOUAZIZ, S., LI, H., AND PAULY, M. 2011. Realtime performance-based facial animation. ACM Trans. Graph. 30, 4(July), 77:1-77:10.). The Gaussian Mixture Model may describe an energy which is used for the continuity among frames:

$$E_{prior} = -\ln p(a, A_n)$$

Where, we call $E_{prior}$ an animation prior energy, and $p(a, A_n)$ is the aforementioned Gaussian Mixture Model.

The present invention combines this energy with the matching energy, and forms a final energy description:

$$E_f = E_t + \omega_{prior} E_{prior}$$

Where $\omega_{prior}$ is a weight coefficient, which is used to weigh tracking accuracy and continuity in the time domain, $E_t$ is the aforementioned matching energy, and $E_{prior}$ is the animation prior energy. The present invention optimizes the energy $E_f$ by adopting a two-step iterative method.

Figure 4:
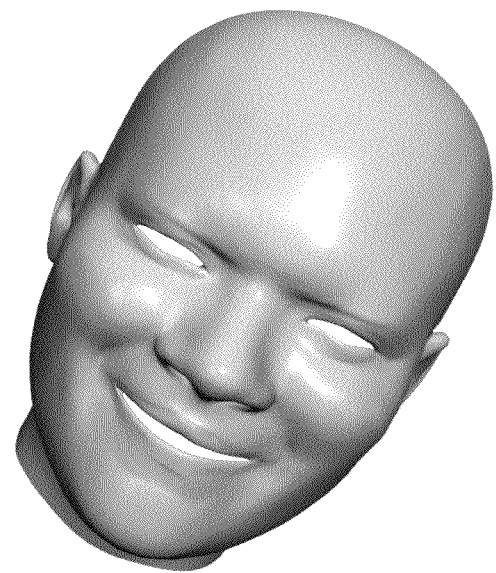
FIG. 4 is a diagram of a 3D face shape generated in a pose and expression parameterization step of the present invention.

In the first step, using the expression coefficient a of the previous frame as an initial value of the current frame and keeping it unchanged, then calculating, by adopting the singular value decomposition for the covariance matrix of corresponding points to obtain the rigid pose, namely the transformation matrix. Then in the second step, the present invention fixes M, and then calculates the expression coefficient a by adopting the gradient descent method. The present invention iteratively executes the two steps until the result is converged, in general situations, a satisfactory result can be obtained with iterations for two times. After obtaining the parametric presentation of the face poses and expressions, we may obtain a corresponding user 3D face shape, which is shown in FIG. 4.

5. Avatar driving: mapping the head poses and facial expression parameters into a virtual avatar to drive an animation character to perform facial animation.

When the parametric head poses and facial expression coefficients are obtained, the present invention may map them into a virtual avatar. For the expression blendshape model $\{D_0, D_1, D_2, \ldots, D_{46}\}$ of the avatar, the present invention maps the parametric pose M and expression coefficient a into the avatar, namely, as described in the following formula:

$$D = M\left(D_0 + \sum_{i=1}^{46} \alpha_i D_i\right)$$

Where M is the transformation matrix of the face poses, $D_0$ is the neutral expression face shape of this user, $D_1, D_2, \ldots, D_{46}$ are other basic expression face shapes in the user expression blendshape model, $\alpha_i$ is the coefficient of the basic expression, and D is the face shape of the final avatar.

Figure 5:
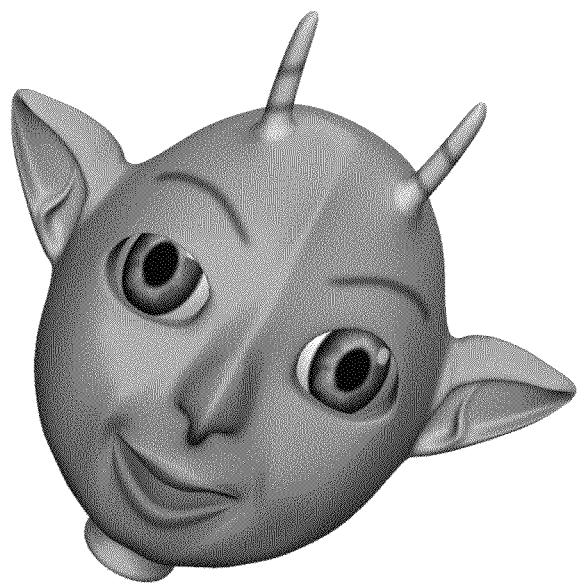
FIG. 5 is a screenshot of driving face animation of an animation character by mapping a parameter of FIG. 4 into an avatar in an avatar driving step of the present invention.

In this way, the avatar driving is accomplished, the result is shown in FIG. 5.

Implementing Instance

The inventor accomplishes embodiments of the present invention on a machine equipped with Intel Core i7 (3.5 GHz) central processor and a web camera providing a resolution ratio of 640×480 with 30 fps. The parameter settings enumerated in the detailed description of embodiments are adopted, and the results as shown in drawings are obtained. In practice, it only takes less than 15 milliseconds to accomplish the capture, parameterization and avatar mapping of one frame on a common computer.

The inventor invites some users to test the prototype system in the present invention. It turns out that with our present hardware configuration, the present invention may process all kinds of large pose rotations, exaggerated expressions in real time, and obtain animation effects approximating closely to user input, which provides great user experience. Meanwhile, under different illumination conditions, such as offices, outdoors with direct sunlight, hotel rooms with little light, the present invention may obtain satisfactory results.

What is claimed is:

1. A method for real-time face animation based on single video camera, comprising the steps:
   (1) image acquisition and labeling: capturing multiple 2D images of a user with different poses and expressions by adopting a video camera, obtaining corresponding 2D face feature points for each image by adopting a 2D feature point regressor, and manually adjusting an inaccurate feature point which is detected automatically;
   (2) data preprocessing: generating a user expression blendshape model and calibrating a camera internal parameter by adopting the images with the labeled 2D face feature points, and thereby obtaining 3D feature points of the images; training, by adopting the 3D feature points and the 2D images acquired in step 1, to obtain a regressor that maps 2D images to the 3D feature points;
   (3) 3D feature point tracking: the user inputs an image in real time by using the video camera; for the input image, tracking the 3D face feature points in a current frame in real time by combining with the 3D face feature points in a previous frame and adopting the regressor obtained in step 2;
   (4) pose and expression parameterization: iteratively optimizing, by adopting locations of the 3D face feature points and combining with the user expression blendshape model obtained in step 2, to obtain parametric presentation of the head poses and facial expressions;
   (5) avatar driving: mapping the head poses and facial expression parameters into a virtual avatar to drive an animation character to perform face animation.

2. The method for real-time face animation according to claim 1, wherein step (1) mainly comprises the following sub-steps:
   (1.1) imitating and making corresponding expressions and poses by the user, comprising different head poses under 15 neutral expressions, and 15 different expressions under 3 poses, altogether 60 groups of different pose and expression data; capturing corresponding 2D images by adopting the video camera;
   (1.2) performing automatic 2D face feature point location for each 2D image by adopting the 2D feature point regressor;
   (1.3) performing a simple drag-and-drop manipulation by the user for a dissatisfying part of the automatically labeled face feature points to restore artificially.

3. The method for real-time face animation according to claim 1, wherein step (2) mainly comprises the following sub-steps:
   (2.1) fitting each 2D image with the labeled 2D face feature points by adopting an existing 3D face expression database, calculating a corresponding rigid parameter, an identity coefficient and an expression coefficient by using a least square method; then optimizing all the 2D images uniformly, obtaining a uniform identity coefficient, calculating and obtaining the user expression blendshape model;

(2.2) performing a simplifying assumption for a pinhole camera model, wherein the pinhole camera model is simplified to include merely one unknown parameter, determining the most appropriate camera parameter by using a dichotomy;

(2.3) based on the user expression blendshape model and the camera parameter obtained in the aforementioned steps, fitting the face rigid parameter and the expression coefficient in each image, obtaining the locations of the 3D face feature points; then performing a data augmentation for the 2D images and their corresponding 3D feature points;

(2.4) training, by adopting the 2D images and the 3D face feature points generated in step 2.3, to obtain the regressor for generating the 3D face feature points by adopting 2D image information.

4. The method for real-time face animation according to claim 1, wherein step (3) mainly comprises the following sub-steps:

(3.1) at run time, firstly, transforming, through a rigid transformation, the 3D feature points in the previous frame to the closest feature point locations in original training data, then finding, in the 3D feature points of the original training data, a group of feature points which are closest to the transformed feature points as initial feature points;

(3.2) for each current feature point, obtaining an appearance vector by sampling on the image in the current frame according to the feature point location;

(3.3) in each primitive classifier, calculating a corresponding feature value for the appearance vector obtained in step 3.2 according to a sequence pair, and locating a corresponding bin according to the feature value, and updating the location of the current feature point by using a corresponding output of the bin; obtaining an output result given by the regressor by successively passing through all the primitive classifiers;

(3.4) for each initial feature point, obtaining a location result by step 3.2 and step 3.3, then getting a median of these results, and obtaining a final result.

5. The method for real-time face animation according to claim 4, wherein step (4) mainly comprises the following sub-steps:

(4.1) keeping the expression coefficient unchanged, calculating a rigid pose of the current face shape by adopting a singular value decomposition method, so that an error between the corresponding feature point in the shape and the 3D face feature point described in claim 4 is minimum;

(4.2) keeping the pose unchanged, fitting the current expression coefficient by adopting a gradient descent algorithm, so that the error between the corresponding feature points in the shape and the 3D face feature points described in claim 4 is minimum;

(4.3) iteratively executing step 4.1 and step 4.2 until convergence, finally obtaining the parametric face pose coefficient and the parametric expression coefficient.

6. The method for real-time face animation according to claim 1, wherein step (5) mainly comprises the following sub-steps:

(5.1) mapping the parametric expression coefficient into the avatar expression blendshape model, generating a corresponding face expression shape;

(5.2) adding the parametric pose to the generated face expression shape, and obtaining a face motion matching with the image input by the user.

* * * * *